United States Patent [19]

Ream et al.

[11] Patent Number: 4,781,402
[45] Date of Patent: Nov. 1, 1988

[54] METAL CHIMNEY ASSEMBLY

[75] Inventors: John D. Ream, Wichita, Kans.; David M. Fetters, Holland, Mich.

[73] Assignee: Metal-Fab, Inc., Wichita, Kans.

[21] Appl. No.: 945,355

[22] Filed: Dec. 22, 1986

[51] Int. Cl.⁴ ............................................. F16L 39/00
[52] U.S. Cl. ................................. 285/47; 285/133.1; 285/419
[58] Field of Search ...................... 285/133.1, 47, 905, 285/224, 419

[56] References Cited

U.S. PATENT DOCUMENTS

| 2,650,112 | 8/1953 | Kinkead | |
|---|---|---|---|
| 3,226,135 | 12/1965 | Epstein | 285/41 |
| 3,872,780 | 3/1975 | Zanias | 285/133.1 |
| 3,902,744 | 9/1975 | Stone | 285/47 |
| 4,029,344 | 6/1977 | Stone | 285/47 |
| 4,184,689 | 1/1980 | Brodell et al. | 285/224 X |
| 4,387,903 | 6/1983 | Smith | 285/47 X |
| 4,666,189 | 5/1987 | Taylor et al. | 285/133.1 X |

Primary Examiner—Thomas F. Callaghan
Attorney, Agent, or Firm—Bill D. McCarthy

[57] ABSTRACT

A metal chimney assembly with floating casing walls supported by expansion clips that allow differential expansion longitudinally and radially of banded together chimney wall sections. The clips are attached to interior flue walls and extend outwardly for engagements into retainers on inner circumferences of exterior casing walls and adjacent thereagainst for holding the casing walls in a spaced relationship with the flue walls during expansion and contraction of the chimney wall sections.

5 Claims, 2 Drawing Sheets

METAL CHIMNEY ASSEMBLY

BACKGROUND OF THE INVENTION

1. Field of the Invention.

The present invention relates to double-wall sections of a metal chimney assembly and more particularly, but not by way of limitation, to the banding together of upper and lower double-wall chimney sections having inner flue walls and exterior floating casing walls separated by spring-action clips.

2. Brief Description of the Prior Art.

Heretofore, there have been various types of connection joints for prefabricated double-wall metal chimneys. In particular, U.S. Pat. No. 3,902,744, issued to Stone, addresses the problem of joined together double-wall metal chimney sections using spacer connectors attached to an outer wall member for providing spaced relationship between the inner and outer wall. This feature provides improved exterior loading onto the inner wall member along with ease in production and assembly. Further, U.S. Pat. No. 4,029,343 to Stone, U.S. Pat. No. 2,650,112 to Kinkaid, U.S. Pat. No. 3,226,135 to Epstein, U.S. Pat. No. 3,872,780 to Zanias provide for different types of double-wall chimneys, connection joints and other features related to these types of chimney pipes. None of these prior art patents provide the unique features and advantages as described herein.

SUMMARY OF THE INVENTION

The present metal chimney assembly, sometimes also referred to as a metal pressure chimney hereinbelow, provides for differential expansion longitudinally and radially when joining together an upper and lower double-wall section using an exterior and interior connecting band.

Through the use of spring-action expansion clips the exterior casing wall is maintained in a continuous spaced relationship from inner flue walls during expansion and contraction of the walls.

The spring-action expansion clips also include one end which is slidably received in a retainer attached to the inner circumference of the casing wall. This allows for radial movement and longitudinal movement during heat expansion and limited circular movement either in a clockwise or counter clockwise direction to aid in assembly.

The metal chimney assembly includes an upper and lower double-wall section having a cylindrical inner flue wall and a cylindrical exterior wall. The two inner flue wall sections of adjacent chimney sections are joined together for a gas tight connection using an interior connecting band. An exterior connecting band connects the exterior casing sections of adjacent chimney sections. The double-walls are held in a spaced relationship by the use of a plurality of expansion clips. Each of the expansion clips has one end attached to the outer circumference of the flue walls, and the other end of the clip is disposed adjacent the inner circumference of one of the casing walls and is received in one of the retainers, the retainers attached to the inner circumferences of the casing walls. The expansion clips hold the walls in a spaced relationship when the flue walls expand at a different rate than the casing walls.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
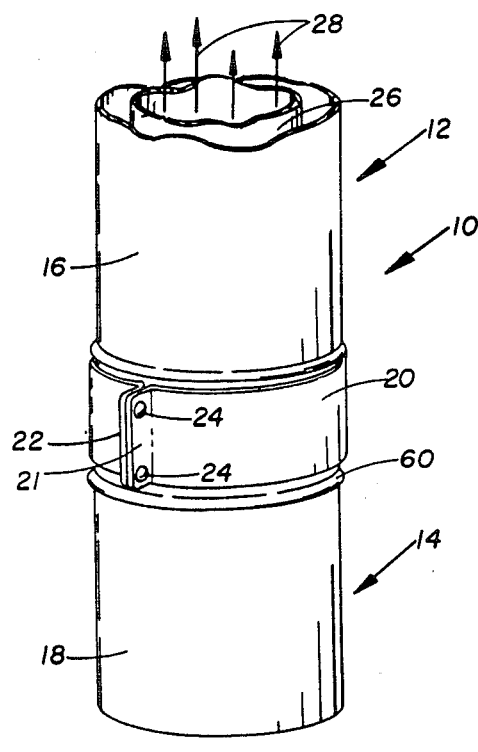
FIG. 1 illustrates a perspective view of a metal pressure chimney assembly constructed in accordance with the present invention and installed with the upper double-wall section joined together with a lower wall section.

FIG. 1 shows a metal pressure chimney assembly designated by the general reference numeral 10. The chimney assembly 10 includes an upper double-wall section and a lower double-wall section which have general reference numerals 12 and 14. In this view, the two wall sections include an upper cylindrical exterior casing wall 16 and a lower exterior casing wall 18. The two walls 16 and 18 are joined together by an outer connecting band 20 having a pair of outwardly extending tabs or brackets 21 and 22 which are joined together by screw fasteners 24.

Also shown in FIG. 1 is a portion of an upper cylindrical inner flue wall 26 showing escaping flue gases indicated by arrows 28.

It should be noted that it is common to use double-wall chimney sections as shown in FIG. 1 wherein the individual sections are joined together using connecting bands with the flue walls and casing walls expanding at different rates. This can be appreciated since the flue walls are in direct contact with the escape of high temperature gases.

Figure 2:
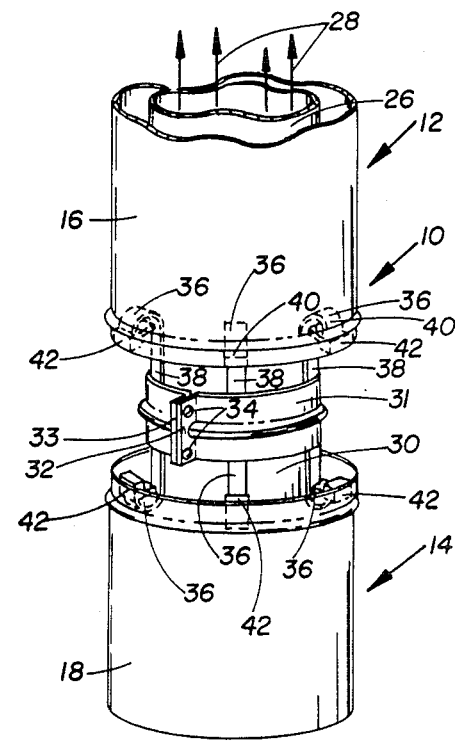
FIG. 2 illustrates a perspective view of the metal chimney assembly of FIG. 1 with an outer connecting band removed and showing an interior connecting band joining together the flue walls and the "J"-shaped expansion clips attached to the outer circumference of the flue walls and adjacent the inner circumference of the casing wall.

In FIG. 2, the outer connecting band 20 has been removed to expose both the upper flue wall 26 and a lower flue wall 30 joined together with an interior connecting band 31 having a pair of brackets 32 and 33 joined together by metal fasteners 34. The inner connecting band 31 provides a tight seal to prevent the escape of flue gases.

Surrounding the outer circumference of the flue walls 26 and 30 are a plurality of expansion clips 36 having a first end portion 38 attached to the sides of the outer circumference of the flue walls 26 and 30. Each of the clips 36 has a "J"-shaped configuration with a distal end 40 slidably received in a clip retainer member 42 attached to the inner circumference of the outer casing walls 16 and 18. A number of such "J"-shaped expansion clips 36 and retainers 42 are supported in spaced apart disposition about the flue walls 26, 30 and the outer casing walls 16, 18 respectively, as shown.

Figure 3:
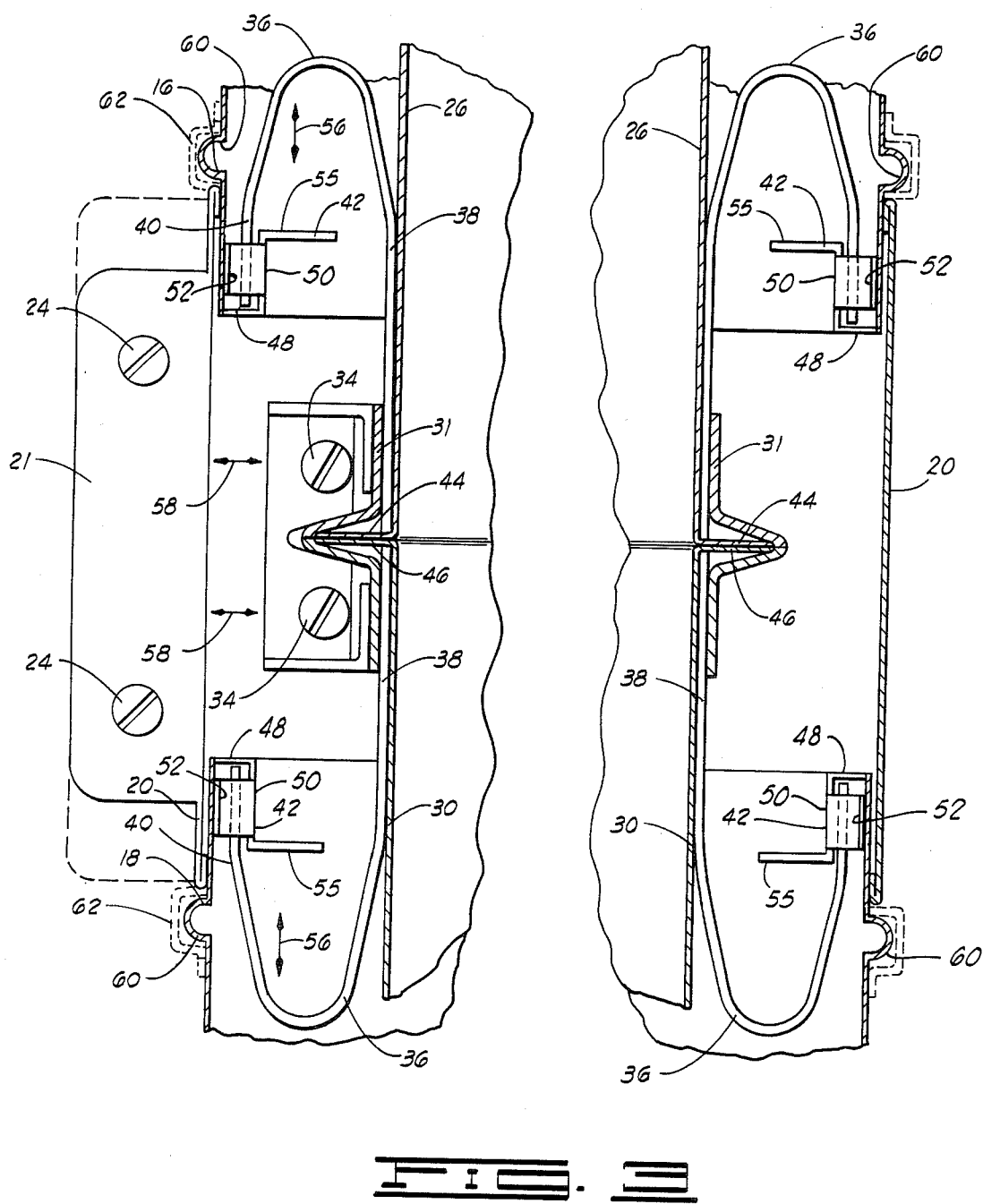
FIG. 3 illustrates a side sectional view of a portion of the upper and lower wall sections showing four of the "J"-shaped expansion clips of the metal pressure chimney assembly of FIG. 1.

Referring now to FIG. 3 an enlarged side sectional view of four of the "J"-shaped clips 36 is shown. The clips 36 are attached, such as by weldment, to the sides of the outer circumference of the flue walls 26 and 30. The walls 26 and 30 have flanges 44 and 46 which are joined together and secured using the interior connecting band 31.

Figure 4:
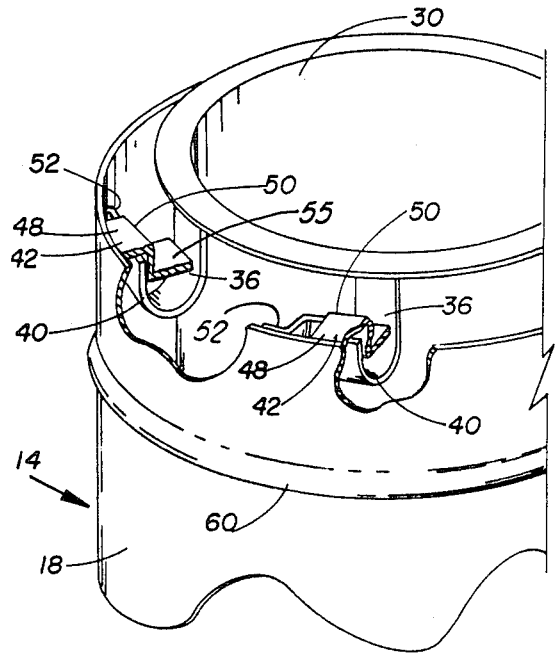
FIG. 4 illustrates an enlarged perspective view of the lower double-wall section with spring-action expansion clips.

The other end 40 of each "J"-shaped expansion clip 36 is received in its corresponding retainer 42. As shown in FIGS. 2 and 4, each retainer 42 is made up of a top portion 48 and a front portion 50 having two side portions 52 extending on opposite sides from the front portion 50. The retainers 42 are attached to the inner circumferences of the upper and lower casing walls 16, 18 so that the top portions 48 are disposed adjacent the ends of the casing walls 16, 18 as shown. Further, each of the retainers 42 has a tab portion 55 which extends from the front portion 50 nearly across the gap between the outer casing walls 16, 18 and the flue walls 26, 30. The purpose of the tab portions 55 is to transfer load stresses to the flue walls 26, 30 so as to resist collapse of the outer casing walls 16, 18 in the event of transverse loads being encountered. This feature assures that the integrity of the assembly is maintained as described.

It should be noted that the lengths of the interior flue walls 26 and 30 are greater than the lengths of the casing walls 16 and 18 to provide sufficient room for installing the interior connecting band 31 prior to installing the outer connecting band 20.

In FIG. 3 it should be noted that the end 40 of each expansion clip 36 is received by its respective retainer 42 on the inner circumference of the casing wall with sufficient room to move longitudinally indicated by arrow 56 along the length of the wall sections 16 and 18 and to also move radially as indicated by arrow 58 as the two walls expand and contract at different rates creating relative movement. Additionally, relative longitudinal and radial movement between the flue wall and the casing wall is allowed even when the ends 40 of the expansion clips 36 are in contact with the top portions 48 of the retainers 42 and the casing walls 16, 18, due to the spring action of the expansion clips 36.

Also shown in FIG. 3 is the outer connecting band 20 securing together the upper and lower casing walls 16 and 18. An alternate embodiment of the casing walls can include an outwardly extending bead 60 therearound. The width of the outer connecting band 20 in this example is extended as shown in dashed lines with a groove 62 received over and indexed with the bead 60 for additional support in providing a strong joint when connecting the two casing walls.

In FIG. 4 an enlarged perspective view of the lower section 14 is shown with a portion of the lower casing wall 18 cutaway to show the retainers 42 receiving the ends 40 of the clips 36 therein to allow for expansion and contraction of the double-wall sections 12 and 14 as heated and cooled.

It is clear that the present invention is well adapted to carry out the objects and to attain the ends and advantages mentioned herein as well as those inherent in the invention. While presently preferred embodiments of the invention have been described for the purposes of this disclosure, numerous changes may be made which will readily suggest themselves to those skilled in the art and which are encompassed within the spirit of the invention disclosed and as defined in the appended claims.

What is claimed is:

1. A metal chimney assembly comprising:
   an upper double-wall section having a cylindrical inner flue wall and a cylindrical exterior casing wall;
   a lower double-wall section having cylindrical inner flue wall and a cylindrical exterior casing wall;
   an interior connecting band for securing together the ends of the flue walls of the upper and lower wall sections;
   an exterior connecting band for securing together the ends of the casing walls of the upper and lower wall sections;
   a plurality of "J"-shaped expansion clips, each of the clips having one end thereof attached to the flue walls such that the clips are disposed around the circumference of the flue walls and extend outwardly therefrom; and
   retainer means supported around the inner circumference of the exterior casing walls for slideably receiving a distal end of the clips, and maintaining the casing walls in a spaced relationship with the flue walls, the retainer means cooperating with the clips for providing longitudinal and radial movement between the inner flue walls and the exterior casing walls when the walls expand and contract at different rates creating relative movement.

2. The chimney assembly as described in claim 1 wherein the expansion clips are disposed around the outer circumferences of the inner flue walls adjacent to the ends of the inner flue walls and the retainer means are disposed around the inner circumferences of the exterior casing walls.

3. A metal chimney assembly comprising:
   an upper double-wall section having a cylindrical inner flue wall and a cylindrical exterior casing wall;
   a lower double-wall section having a cylindrical inner flue wall and a cylindrical exterior casing wall;
   an interior connecting band for securing together the ends of the inner flue walls of the upper and lower wall sections;
   an exterior connecting band for securing together the ends of the exterior casing walls of the upper and lower wall sections;
   a plurality of retainers attached to the inner circumferences of the casing walls; and
   a plurality of expansion clips disposed around and attached to the outer circumferences of the flue walls, the clips extending ouwardly and having the distal portions slideably received inside the retainers for maintaining the casing walls in a spaced relationshp with the flue walls, the clips cooperating with the retainers for providing longitudinal and radial movement between the inner flue walls and the exterior casing walls when the walls expand and contract at different rates creating relative movement.

4. The chimney assembly as described in claim 3 wherein each of the expansion clips has a "J"-shaped configuration having one end thereof attached to the outer circumference of one of the flue walls and adjacent the end of the flue wall, the distal end of the "J"-shaped expansion clip extending outwardly and slideably received in one of the retainers, the distal end of the "J"-shaped expansion clip being disposed adjacent to the inner circumference of one of the casing walls and engaging its respective retainer supported by the inner circumference of one of the casing walls so as to maintain continuous support between the casing walls and the flue walls when the wall sections expand and contract.

5. A metal chimney assembly comprising:
- an upper double-wall section having a cylindrical inner flue wall and a cylindrical exterior casing wall;
- a lower double-wall section having a cylindrical inner flue wall and a cylindrical exterior casing wall;
- an interior connecting band for securing together the ends of the flue walls of the upper and lower walls sections;
- an exterior connecting band for securing together the ends of the casing walls of the upper and lower wall sections;
- a plurality of retainers supported around the inner circumference of the exterior casing walls, each of the retainers having a tab portion extending toward the inner flue walls to transfer transverse stress to the inner flue walls; and
- a plurality of expansion clips attached to and disposed around the circumferences of the flue walls, the clips extending outwardly and engaging in the retainers on the inner circumference of the casing walls and adjacent thereagainst for maintaining the casing walls in a spaced relationship with the flue walls, the expansion clips disposed around the outer circumferences of the inner flue walls adjacent to the ends of the inner flue walls with one end of each such expansion clip attached thereto, the other end of each of the expansion clips slideably received in one of the retainers, each of the expansion clips having a "J"-shaped configuration and having one end thereof attached to the flue wall, the distal end of the "J"-shaped expansion clip slideably received in one of the retainers.

* * * * *